United States Patent
Rosoman et al.

(10) Patent No.: US 9,773,194 B2
(45) Date of Patent: Sep. 26, 2017

(54) SELECT TYPE OF TEST IMAGE BASED ON SIMILARITY SCORE TO DATABASE IMAGE

(71) Applicant: Longsand Limited, Cambridge (GB)

(72) Inventors: Tom Rosoman, Cambridge (GB); David Bettinson, Cambridge (GB); Chris Smith, Cambridge (GB); Unai Ayo Aresti, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 0 days.

(21) Appl. No.: 15/009,156

(22) Filed: Jan. 28, 2016

(65) Prior Publication Data

US 2017/0220898 A1  Aug. 3, 2017

(51) Int. Cl.
G06K 9/62 (2006.01)
G06K 9/32 (2006.01)

(52) U.S. Cl.
CPC ........... *G06K 9/6215* (2013.01); *G06K 9/325* (2013.01); *G06K 2209/15* (2013.01); *G06K 2209/25* (2013.01)

(58) Field of Classification Search
CPC .................. G06K 2209/15; G08G 1/0175
See application file for complete search history.

(56) References Cited

U.S. PATENT DOCUMENTS

| | | | |
|---|---|---|---|
| 7,738,706 B2 | 6/2010 | Aradhye et al. | |
| 8,023,725 B2 | 9/2011 | Schwartzberg et al. | |
| 8,218,822 B2 | 7/2012 | Sefton | |
| 2005/0029347 A1 | 2/2005 | Noble et al. | |
| 2012/0263352 A1 | 10/2012 | Fan et al. | |
| 2016/0110605 A1* | 4/2016 | Holzschneider | G06F 17/30256 382/103 |

FOREIGN PATENT DOCUMENTS

CN 104408931 A 3/2015

OTHER PUBLICATIONS

Hooi Sin Ng et al., "Detection and Recognition of Malaysian Special License Plate Based on SIFT Features", Computer Vision and Pattern Recognition (cs.CV), posted 2015, 8 pages total.*
Chakraborty, S. et al., "An Improved Template Matching Algorithm for Car License Plate Recognition," (Research Paper), International Journal of Computer Applications 118.25, May 2015, 7 pages, available at http://research.ijcaonline.org/volume118/number25/pxc3903670.pdf.

* cited by examiner

Primary Examiner — Brian P Werner
(74) Attorney, Agent, or Firm — Mannava & Kang, P.C.

(57) ABSTRACT

A homography is determined between a test image and a plurality of database images based on a location of a character along a main line of text of the test image. A similarity score is determined for each of the plurality of database images based on the determined homography. The similarity score may measure a similarity of a characteristic between the test image and the corresponding database image. The characteristic may be at a location separate from the main line of text of the test image. A type of the test image may be selected based on the similarity scores.

15 Claims, 3 Drawing Sheets

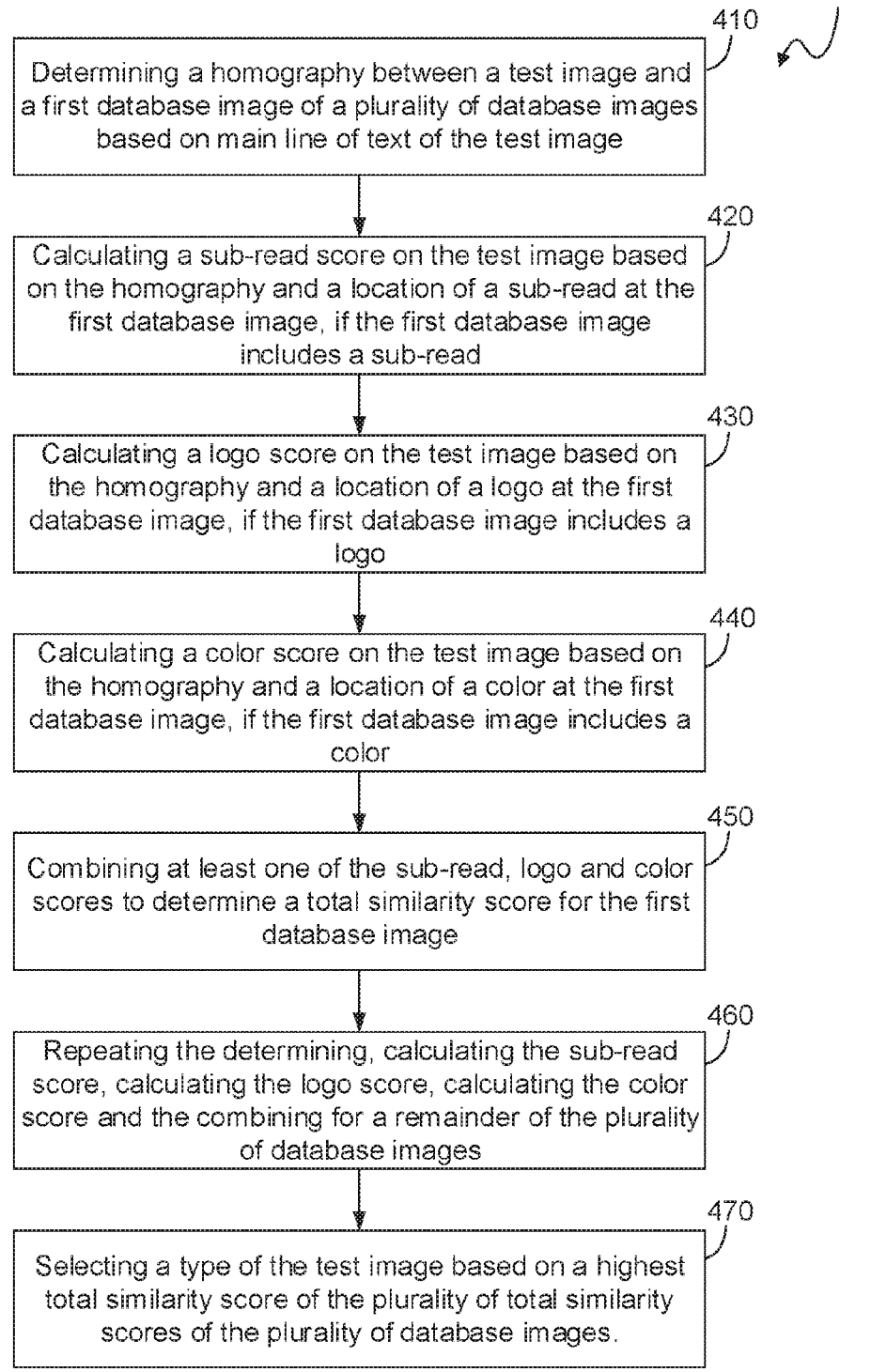

SELECT TYPE OF TEST IMAGE BASED ON SIMILARITY SCORE TO DATABASE IMAGE

BACKGROUND

Recording devices, such as cameras, may capture images and attempt to identify the captured images. Manufacturers, vendors and/or clients are challenged to more accurately identify the types of captured images.

BRIEF DESCRIPTION OF THE DRAWINGS

The following detailed description references the drawings, wherein:

FIG. 4 is an example flowchart of a method for selecting a type of a test image based on a similarity score to a database image.

DETAILED DESCRIPTION

Figure 1:
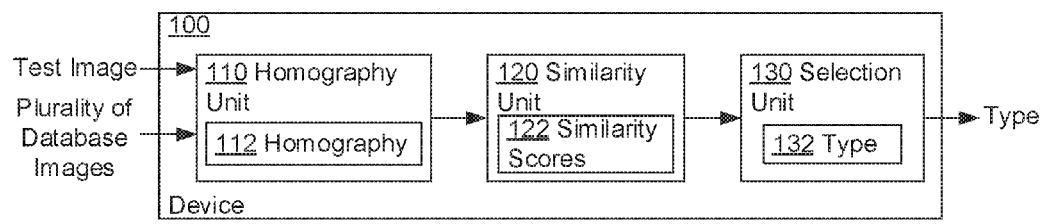
FIG. 1 is an example block diagram of a device to select a type of a test image based on a similarity score to a database image.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Some countries, such as the United Arab Emirates (UAE), may have several different layouts of vehicle registration plates. For example, some types of vehicle registration plates may have short blocks of characters away from the main block of text (e.g. sub-read) that may need to be read in order to distinguish between different types of vehicle registration plates. In another example, the different types of vehicle registration plates may be distinguishable based on something other than the characters, such as logos or colors.

Using optical character recognition (OCR) alone may not allow for distinguishing between non-character logos or two different logos have the same characters. Also, OCR may be difficult to use on smaller characters. Further, logo detection and matching may be problematic with smaller scale logos.

Examples may allow for characters or logos away from a main text to be read more accurately. For instance, examples may include a database of with images of different vehicle registration plate types. Features to look for in each vehicle registration plate type may be specified (e.g. sub-read, logo and color), along with a location of the features in the corresponding vehicle registration plate type.

In one example, a device may include a homography unit, similarity unit and a selection unit. The homography unit may determine a homography between a test image and a plurality of database images based on a location of a character along a main line of text of the test image. The similarity unit may determine a similarity score for each of the plurality of database images based on the determined homography. The similarity score may measure a similarity of a characteristic between the test image and the corresponding database image. The characteristic may be at a location separate from the main line of text of the test image. The selection unit may select a type of the test image based on the similarity scores.

Thus, example may allow images, such as vehicle registration plates, to be distinguished that would otherwise be read identically. Examples may also more accurately identify images having smaller scale text as well noise and blurring around logos. For example, vehicle registration plates may be differentiated where the logos are different but the characters in the logo are the same. Further, vehicle registration plates may be differentiated where the logos do not contain characters at all. Also, examples may allow a comparison of plate types that contain different combinations of sub-reads, logos and patches of colors.

Referring now to the drawings, FIG. 1 is an example block diagram of a device to select a type of a test image based on a similarity score to a database image. The device 100 may include or be part of a microprocessor, a controller, a memory module or device, an image capture device, a notebook computer, a desktop computer, an all-in-one system, a server, a network device, a wireless device, a network and the like.

The device 100 is shown to include a homography unit 110, a similarity unit 120 and a selection unit 130. The homography, similarity and selection units 110, 120 and 130 may include, for example, a hardware device including electronic circuitry for implementing the functionality described below, such as control logic and/or memory. In addition or as an alternative, the homography, similarity and selection units 110, 120 and 130 may be implemented as a series of instructions encoded on a machine-readable storage medium and executable by a processor.

The homography unit 110 may determine a homography 112 between a test image and a plurality of database images based on a location of a character along a main line of text of the test image. Homography relates to an isomorphism of projective spaces, induced by an isomorphism of the vector spaces from which the projective spaces derive. Any two images of the same planar surface in space may be related by a homography. This may have many applications, such as image rectification, image registration, or computation of rotation and translation between two images.

The similarity unit 120 may determine a similarity score 122 for each of the plurality of database images based on the determined homography 112. The similarity score 122 may measure a similarity of a characteristic between the test image and the corresponding database image. The characteristic may be at a location separate from the main line of text of the test image. The selection unit 130 may select a type 132 of the test image based on the similarity scores 122. The device 100 is explained in greater detail below with respect to FIGS. 2-4.

Figure 2:
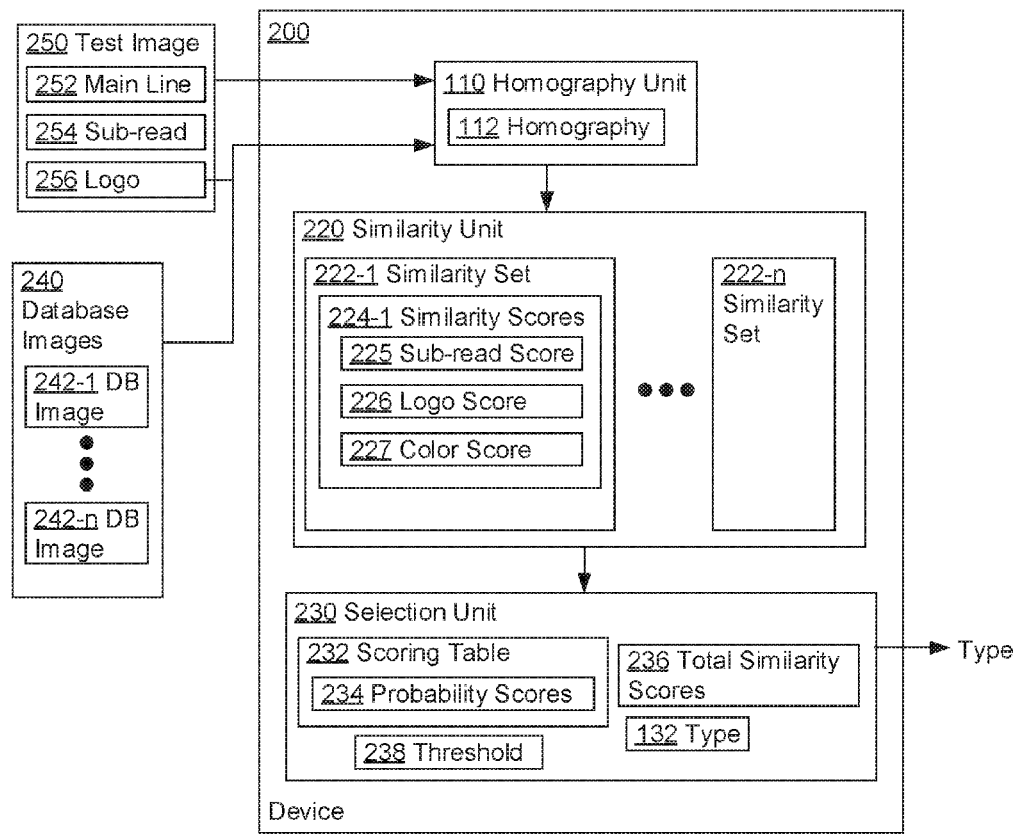
FIG. 2 is another example block diagram of a device to select a type of a test image based on a similarity score to a database image.

FIG. 2 is another example block diagram of a device 200 to select a type of a test image based on a similarity score to a database image. The device 200 may include or be part of a microprocessor, a controller, a memory module or device, an image capture device, a notebook computer, a desktop computer, an all-in-one system, a server, a network device, a wireless device, a network and the like. Further, the device 200 of FIG. 2 may include at least the functionality and/or hardware of the device 100 of FIG. 1. For example, a similarity unit 220 and a selection unit 230 of the device 200 of FIG. 2 may include at least the respective functionality and/or hardware of the similarity and selection units 110 and 120 of the device 100 of FIG. 1. The device 200 of FIG. 2 is also shown to receive a test image 250 and a plurality of database images 240.

Upon receiving the test image 250, the device 200 first attempts to read a main line of text 252 of the test image 250. If successful, the homography unit 110 may determine a homography 112 between a test image 250 and a plurality of database images 242-1 to 242-$n$, where n is a natural number, based on a location of a character along the main line of text 252 of the test image 250. The main line of text 252 of the test image 250 may include a plurality of characters.

For example, the homography 112 may be determined based on a series of point correspondences between a top and a bottom of at least two of the plurality of characters of the main line of text 252 in the test image 250 and a normalized coordinate system, such as a coordinate system with an origin at a middle of the main text, with 1 in the y direction being the character height and 1 in the x direction being the distance between character centers. As long as there are at least 2 characters in the main text, 4 point correspondences may be formed, which allows the homography unit 110 to calculate a best fitting homography between normalized coordinates and the test image 250.

The similarity unit 220 may determine a similarity score 224 for each of the plurality of database images 242-1 to 242-$n$ based on the determined homography 112. The similarity score 122 may measure a similarity of a characteristic between the test image and the corresponding database image 242. The characteristic may be at a location separate from the main line of text 252 of the test image 250.

For example, the similarity unit 220 may determine a similarity set 222 of similarity scores 224 for each of the plurality of database images 242-1 to 242-$n$. Each of the similarity scores 224 of the similarity set 222 may relate to a different characteristic. For instance, the similarity scores 224 of the similarity set 222 may include a sub-read score 225, logo score 226, color score 227 and/or the like.

The sub-read score 225 may relate to an accuracy in identifying text at a location separate from the main line of text 252 of the test image 250. The logo score 226 may relate to an accuracy in identifying a logo 256 at a location separate from the main line of text 252 of the test image 250. The color score 227 may relate to an accuracy in identifying a color (e.g. not white, grey or black) at a location of the test image 250.

For instance, the similarity set 222-1 of a first database image 242-1 242-1 of the plurality of database images 242-1 to 242-$n$ may include the sub-read score 225, if the first database image 242-1 242-1 includes a sub-read. The similarity unit 220 may map a location of the sub-read of the first database image 242-1 to a corresponding location of the test image 250 based on the homography 112. The similarity unit 220 may calculate the sub-read score 225 for the similarity set 222-1 of the first database image 242-1 based on a confidence that a character at the corresponding location of the test image 250 is identified.

The similarity unit 220 may calculate the sub-read score 225 for a remainder of the plurality of database images 242-1 to 242-$n$ that include a sub-read. The homography unit 110 may refine the homography 112 based on the location of the sub-read 254 of the test image 250, if the test image 250 is determined to include the sub-read 254.

The similarity set 222-1 of a first database image 242-1 of the plurality of database images 242-1 to 242-$n$ may include the logo score 226, if the first database image 242-1 includes a logo. The similarity unit 220 may de-skew a location of the test image 250 corresponding to a location of a logo in the first database image 242-1 based on the homography 112. The similarity unit 220 may calculate the logo score 226 for the similarity set 222-1 of the first database image 242-1 based on a confidence that a logo 256 at the corresponding location of the test image 250 matches the logo of the first database image 242-1.

The similarity unit 220 may calculate the logo score 226 for a remainder of the plurality of database images 242-1 to 242-$n$ that include a logo. The homography unit 110 may refine the homography 112 based on the location of the logo 256 of the test image 250, if the test image 250 is determined to include the logo 256. The similarity unit 220 may identify the logo or sub-read based on image recognition techniques, such as content-based image retrieval, pose estimation, optical character recognition (OCR), and the like.

The similarity set 222-1 of a first database image 242-1 of the plurality of database images 242-1 to 242-$n$ may include the color score 227, if the first database image 242-1 includes a color. The similarity unit 220 may map a region of the first database image 242-1 having the color to a corresponding region of the test image 250 based on the homography 112. The similarity unit 220 may calculate the color score 227 for the similarity set 222-1 of the first database image 242-1 based on a percentage of the regions of the first database image 242-1 and the test image 250 that have a same color.

The similarity unit 220 may calculate the color score 227 for a remainder of the plurality of database images 242-1 to 242-$n$ that include a color. The homography unit 110 may refine the homography 112 based on the region of the color of the test image 250, if the test image 250 is determined to include the color.

The selection unit 230 may select a type 132 of the test image 250 based on the similarity scores 224. For example, the selection unit 230 may combine the similarity scores 224 of each of the similarity sets 221-1 to 222-$n$, where n is a natural number, to determine a total similarity score 236 for each of plurality of database images 242-1 to 242-$n$. Each of the total similarity scores 236 to be normalized.

In one example, the selection unit 230 may compare a highest of the total similarity scores 236 to a threshold 238. The selection unit 230 may determine a type 132 of the test image 250 based on the database image corresponding to the highest total similarity score 236, if the highest total similarity score 236 is greater than the threshold 238. If none of the total similarity scores 236 are greater than the threshold 238, then it may be determined that the test image 250 does not match any of the types 132 of the plurality of database images 242-1 to 242-$n$.

In another example, the selection unit 230 may look up each of the similarity scores 224 at a scoring table 232 to determine a corresponding probability score 234. The probability score 234 of the similarity score 224 may infer that test image 250 is a same type 132 as the corresponding database image 242, if the probability score 234 is positive. Conversely, the probability score 234 of the similarity score 224 may infer that test image 250 is not a same type 132 as the corresponding database image 242, if the probability score 234 is negative. The selection unit 230 may total the probability scores 234 corresponding to each of the similarity sets 221-1 to 222-$n$ to determine the normalized total similarity scores 236.

In one example, the test image 250 may include a vehicle registration plate. Further, the plurality of database images 242-1 to 242-$n$ may include different types of vehicle registration plates. The sub-read, logo and/or color scores 225-227 may relate to characteristics of the vehicle registration plate. Thus, the type 132 of the test image 250 may indicate the type of vehicle registration plate.

For example, each of the total similarity scores 236 may initially be 0. For each type of similarity score 224 of a vehicle registration plate, the value may be between 0 and 100, with 100 being a perfect match. So for instance, regarding color, if the vehicle registration plate type (e.g database image 242) indicates a certain region to be red and it is determined that every pixel in that region of the test image 250 is red, the color score 227 may be 100. If instead, half of the pixels in that region of the test image 250 were red, the color score 227 may be 50.

The color score 227 may then be converted by the scoring table 232 into a probability score 234, such as between −1000 and 1000. Different type of similarity scores 227 may have different probability scores 234 for different values. For example, each of different types of similarity scores 222 may have a separate column in the scoring table 232 indicating the probability score 234, such that a same similarity score value would provide different probability scores 234 for different types of similarity scores 222. The scoring table 232 may be formed from empirical data.

For instance, each value of the scoring table 232 may be 10 times the base 2 logarithm of $P(A|T)/P(A|\sim T)$, where A is the event that the 'feature score' is in that range and T is the event that it is this vehicle registration plate type. Positive probability scores 234 may infer that this similarity score 224 is evidence in favor of this vehicle registration plate type of a given database image 242 and negative probability scores 234 may infer that this similarity score 224 is evidence against this vehicle registration plate type of the given database image 242.

In this manner, the higher the total similarity score 236 for a vehicle registration plate type of the given database image 242, the higher the probability may be for the vehicle registration plate type of the given database image 242, regardless of how many similarity scores 224 were used to create the total similarity score 236. For example, a plate type A (e.g. one of the database images 242) may have a logo score 226 of 12, a logo score 226 of 84 and a color score 227 of 3 while a plate type B (e.g. another of the database images 242) may only have a sub-read score 225 of 95. The respective probability scores 234 for plate type A may be −50, 137 and −55, giving a combined score of 32. The probability score 234 for plate type B may be 60, giving a combined score of 60. Thus, the selection unit 230 may choose plate type B, as it has a greater probability score than plate type A.

Figure 3:
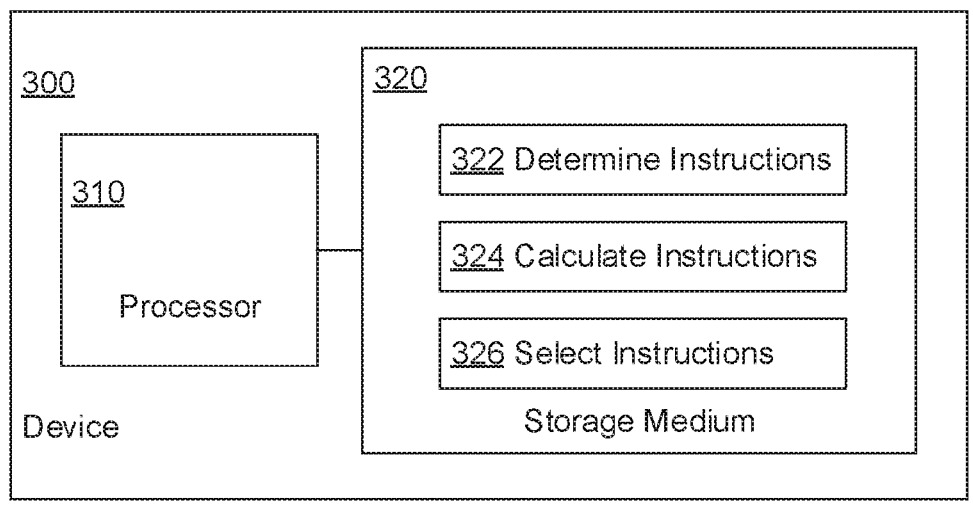
FIG. 3 is an example block diagram of a computing device including instructions for selecting a type of a test image based on a similarity score to a database image.

FIG. 3 is an example block diagram of a computing device 300 including instructions for selecting a type of a test image based on a similarity score to a database image. In the embodiment of FIG. 3, the computing device 300 includes a processor 310 and a machine-readable storage medium 320. The machine-readable storage medium 320 further includes instructions 322, 324 and 326 for selecting the type of the test image based on the similarity score to the database image.

The computing device 300 may be included in or part of, for example, a microprocessor, a controller, a memory module or device, a notebook computer, a desktop computer, an all-in-one system, a server, a network device, a wireless device, or any other type of device capable of executing the instructions 322, 324 and 326. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322, 324 and 326 to implement selecting the type of the test image based on the similarity score to the database image. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for selecting the type of the test image based on the similarity score to the database image.

Moreover, the instructions 322, 324 and 326, when executed by a processor (e.g., via one processing element or multiple processing elements of the processor) can cause the processor to perform processes, such as, the process of FIG. 4. For example, the determine instructions 322 may be executed by the processor 310 to determine a homography between a test image and a plurality of different types of database images based on a main line of text of the test image. The main line of text of the test image may include a plurality of characters. The homography may be determined based on a series of point correspondences between a top and a bottom of at least two of the plurality of characters of the main line of text in the test image and a normalized coordinate system.

The calculate instructions 324 may be executed by the processor 310 to calculate a total similarity score for each of the different types of database images based on at least one of a sub-read, logo and color score for each of the different types of database images. The select instructions 326 may be executed by the processor 310 to select a type of the test image based on a highest total similarity score of the plurality of different types of database images. The sub-read, logo and/or color scores may be determined based on the homography.

FIG. 4 is an example flowchart of a method 400 for selecting a type of a test image based on a similarity score to a database image. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 determines a homography 112 between a test image 250 and a first database image 242-1 of a plurality of database images 242-1 to 242-n based on main line of text 252 of the test image 250. At block 420, the device 200 calculates a sub-read score 225 on the test image 250 based on the homography 112 and a location of a sub-read at the first database image 242-1, if the first database image 242-1 includes a sub-read.

At block 430, the device 200 calculates a logo score 226 on the test image 250 based on the homography 112 and a location of a logo at the first database image 242-1, if the first database image 242-1 includes a logo. At block 440, the device 200 calculates a color score 227 on the test image 250 based on the homography 112 and a location of a color at the first database image 242-1, if the first database image 242-1 includes a color.

At block 450, the device 200 combines at least one of the sub-read, logo and color scores 225-227 to determine a total similarity score 236 for the first database image 242-1. At block 460, the device 200 repeats the determining of block 410, calculating the sub-read score 225 of block 420, calculating the logo score 226 of block 430, calculating the color score 227 of block 440 and the combining of block 450 for a remainder of the plurality of database images 242-1 to 242-n.

At block 470, the device 200 selects a type 132 of the test image 250 based on a highest total similarity score 236 of the plurality of total similarity scores 236 of the plurality of database images 242-1 to 242-n. In one example, the test image 250 may include a vehicle registration plate. Further, the plurality of database images 242-1 to 242-n may include different types of vehicle registration plates. The sub-read, logo and/or color scores 225-227 may relate to characteristics of the vehicle registration plate. Thus, the type 132 of the test image 250 may indicate the type of vehicle registration plate.

We claim:

1. A device, comprising:
   at least one processor, and
   a memory storing instructions executable by the at least one processor to:
   determine a homography between a test image and a plurality of database images based on a location of a character along a main line of text of the test image;
   determine a similarity score for each of the plurality of database images based on the determined homography, the similarity score to measure a similarity of a characteristic between the test image and the corresponding database image, the characteristic to be at a location separate from the main line of text of the test image; and
   select a type of the test image based on the similarity scores.

2. The device of claim 1, wherein,
   the instructions to determine the similarity score further comprise instructions to determine a similarity set of similarity scores for each of the plurality of database images, and
   each of the similarity scores of the similarity set is to relate to a different characteristic.

3. The device of claim 2, wherein,
   the similarity scores of the similarity set are to include at least one of a sub-read score, logo score and color score,
   the sub-read score is to relate to an accuracy in identifying text at a location separate from the main line of text of the test image,
   the logo score is to relate to an accuracy in identifying a logo at a location separate from the main line of text of the test image, and
   the color score is to relate to an accuracy in identifying a color at a location of the test image.

4. The device of claim 3, wherein,
   the similarity set of a first database image of the plurality of database images is to include the sub-read score, if the first database image includes a sub-read,
   the instructions to determine the similarity score further comprise instructions to map a location of the sub-read of the first database image to a corresponding location of the test image based on the homography, and
   the instructions to determine the similarity score further comprise instructions to calculate the sub-read score for the similarity set of the first database image based on a confidence that a character at the corresponding location of the test image is identified.

5. The device of claim 4, wherein,
   the instructions to determine the similarity score further comprise instructions to calculate the sub-read score for a remainder of the plurality of database images that include a sub-read, and
   the instructions to determine the homography further comprise instructions to refine the homography based on the location of the sub-read of the test image, if the test image is determined to include the sub-read.

6. The device of claim 3, wherein,
   the similarity set of a first database image of the plurality of database images is to include the logo score, if the first database image includes a logo,
   the instructions to determine the similarity score further comprise instructions to de-skew a location of the test image corresponding to a location of a logo in the first database image based on the homography, and
   the instructions to determine the similarity score further comprise instructions to calculate the logo score for the similarity set of the first database image based on a confidence that a logo at the corresponding location of the test image matches the logo of the first database image.

7. The device of claim 6, wherein
   the instructions to determine the similarity score further comprise instructions to calculate the logo score for a remainder of the plurality of database images that include a logo, and
   the instructions to determine the homography further comprise instructions to refine the homography based on the location of the logo of the test image, if the test image is determined to include the logo.

8. The device of claim 3, wherein
   the similarity set of a first database image of the plurality of database images is to include the color score, if the first database image includes a color,
   the instructions to determine the similarity score further comprise instructions to map a region of the first database image having the color to a corresponding region of the test image based on the homography, and
   the instructions to determine the similarity score further comprise instructions to calculate the color score for the similarity set of the first database image based on a percentage of the regions of the first database image and the test image that have a same color.

9. The device of claim 8, wherein,
the instructions to determine the similarity score further comprise instructions to calculate the color score for a remainder of the plurality of database images that include a color, and
the instructions to determine the homography further comprise instructions to refine the homography based on the region of the color of the test image, if the test image is determined to include the color.

10. The device of claim 3, wherein,
the instructions to select further comprise instructions to combine the similarity scores of each of the similarity sets, to determine a total similarity score for each of plurality of database images, each of the total similarity scores to be normalized, and
the instructions to select further comprise instructions to compare a highest of the total similarity scores to a threshold, and
the instructions to select further comprise instructions to determine a type of the test image based on the database image corresponding to the highest total similarity score, if the highest total similarity score is greater than the threshold.

11. The device of claim 10, wherein,
the instructions to select further comprise instructions to look up each of the similarity scores at a scoring table to determine a corresponding probability score,
the probability score of the similarity score is to infer that test image is a same type as the corresponding database image, if the probability score is positive,
the probability score of the similarity score is to infer that test image is not a same type as the corresponding database image, if the probability score is negative, and
the instructions to select further comprise instructions to total the probability scores corresponding to each of the similarity sets to determine the normalized total similarity scores.

12. A method, comprising:
determining a homography between a test image and a first database image of a plurality of database images based on main line of text of the test image;
calculating a sub-read score on the test image based on the homography and a location of a sub-read at the first database image, if the first database image includes a sub-read;
calculating a logo score on the test image based on the homography and a location of a logo at the first database image, if the first database image includes a logo;
calculating a color score on the test image based on the homography and a location of a color at the first database image, if the first database image includes a color;
combining at least one of the sub-read, logo and color scores to determine a total similarity score for the first database image;
repeating the determining, calculating the sub-read score, calculating the logo score, calculating the color score and the combining for a remainder of the plurality of database images; and
selecting a type of the test image based on a highest total similarity score of the plurality of total similarity scores of the plurality of database images.

13. The method of claim 12, wherein,
the test image includes a vehicle registration plate,
the plurality of database images include different types of vehicle registration plates, and
at least one of the sub-read, logo and color scores relate to characteristics of the vehicle registration plate.

14. A non-transitory computer-readable storage medium storing instructions that, if executed by a processor of a device, cause the processor to:
determine a homography between a test image and a plurality of different types of database images based on a main line of text of the test image;
calculate a total similarity score for each of the different types of database images based on at least one of a sub-read, logo and color score for each of the different types of database images; and
select a type of the test image based on a highest total similarity score of the plurality of different types of database images, wherein
at least one of the sub-read, logo and color scores are determined based on the homography.

15. The non-transitory computer-readable storage medium of claim 14, wherein,
the main line of text of the test image includes a plurality of characters, and
the homography is determined based on a series of point correspondences between a top and a bottom of at least two of the plurality of characters of the main line of text in the test image and a normalized coordinate system.

* * * * *